United States Patent
Seufert et al.

(10) Patent No.: US 11,451,121 B2
(45) Date of Patent: Sep. 20, 2022

(54) METHOD FOR PRODUCING A MATERIAL LAYER AND A MATERIAL LAYER STRUCTURE FOR A DYNAMOELECTRIC ROTARY MACHINE

(71) Applicant: Siemens Aktiengesellschaft, Munich (DE)

(72) Inventors: Reiner Seufert, Salz (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/259,841

(22) PCT Filed: Jul. 10, 2019

(86) PCT No.: PCT/EP2019/068480
§ 371 (c)(1),
(2) Date: Jan. 12, 2021

(87) PCT Pub. No.: WO2020/011823
PCT Pub. Date: Jan. 16, 2020

(65) Prior Publication Data
US 2021/0320571 A1    Oct. 14, 2021

(30) Foreign Application Priority Data
Jul. 13, 2018   (EP) ..................... 18183457

(51) Int. Cl.
*H02K 15/02* (2006.01)
*B33Y 10/00* (2015.01)
(Continued)

(52) U.S. Cl.
CPC ............. *H02K 15/02* (2013.01); *B22F 5/009* (2013.01); *B22F 10/10* (2021.01); *B22F 10/50* (2021.01);
(Continued)

(58) Field of Classification Search
CPC ...... B22F 2999/00; B22F 10/10; B22F 10/20; B22F 3/1021; B33Y 10/00; C09K 8/805; H02K 15/02; H02K 1/02; Y10T 29/49012
(Continued)

(56) References Cited

U.S. PATENT DOCUMENTS 8,524,147 B2 *  9/2013  Suzuki ................. B22F 1/0074
                                                     419/65
9,393,088 B2 *  7/2016  Hachenberg ........... C22C 19/07
(Continued)

FOREIGN PATENT DOCUMENTS

CN    106134040 A    11/2016
EP    3 225 758 A1   12/2017
(Continued)

OTHER PUBLICATIONS

PCT International Search Report and Written Opinion of International Searching Authority dated Aug. 28, 2019 corresponding to PCT International Application No. PCT/EP2019/068480 filed Jul. 7, 2019.

*Primary Examiner* — Thiem D Phan
(74) *Attorney, Agent, or Firm* — Henry M. Feiereisen LLC

(57) ABSTRACT

In a method for producing a material layer with a layer thickness between 0.5 and 500 μm, a suspension with a binding agent and solid particles is applied through a template onto a base area for obtaining a green body. The binding agent is driven out of the green body and a permanent cohesion of the solid particles is created by heating and/or by compaction.

19 Claims, 3 Drawing Sheets

(51) Int. Cl.
 *B33Y 80/00* (2015.01)
 *B22F 10/10* (2021.01)
 *B22F 10/50* (2021.01)
 *B22F 5/00* (2006.01)

(52) U.S. Cl.
 CPC .............. *B33Y 10/00* (2014.12); *B33Y 80/00* (2014.12); *Y10T 29/49012* (2015.01)

(58) Field of Classification Search
 USPC ............... 29/598, 428, 527.1, 596, 604, 607
 See application file for complete search history.

(56) References Cited

U.S. PATENT DOCUMENTS

2009/0152976 A1  6/2009  Bott et al.
2013/0076193 A1  3/2013  Kim et al.
2016/0072342 A1  3/2016  Kumar et al.
2016/0226323 A1  8/2016  Piascik et al.
2017/0179801 A1  6/2017  Ballweg et al.
2019/0305616 A1  10/2019  Bittner et al.

FOREIGN PATENT DOCUMENTS

| | | |
|---|---|---|
| JP | S5734750 A | 2/1982 |
| JP | 2004147470 A | 5/2004 |
| JP | 2007221869 A | 8/2007 |
| JP | 2008131696 A | 6/2008 |
| JP | 2009148156 A | 7/2009 |
| JP | 2013074767 A | 4/2013 |
| JP | 6147831 B2 | 6/2017 |
| WO | WO 2013/007830 A2 | 1/2013 |
| WO | WO 2013/126546 A1 | 8/2013 |

\* cited by examiner

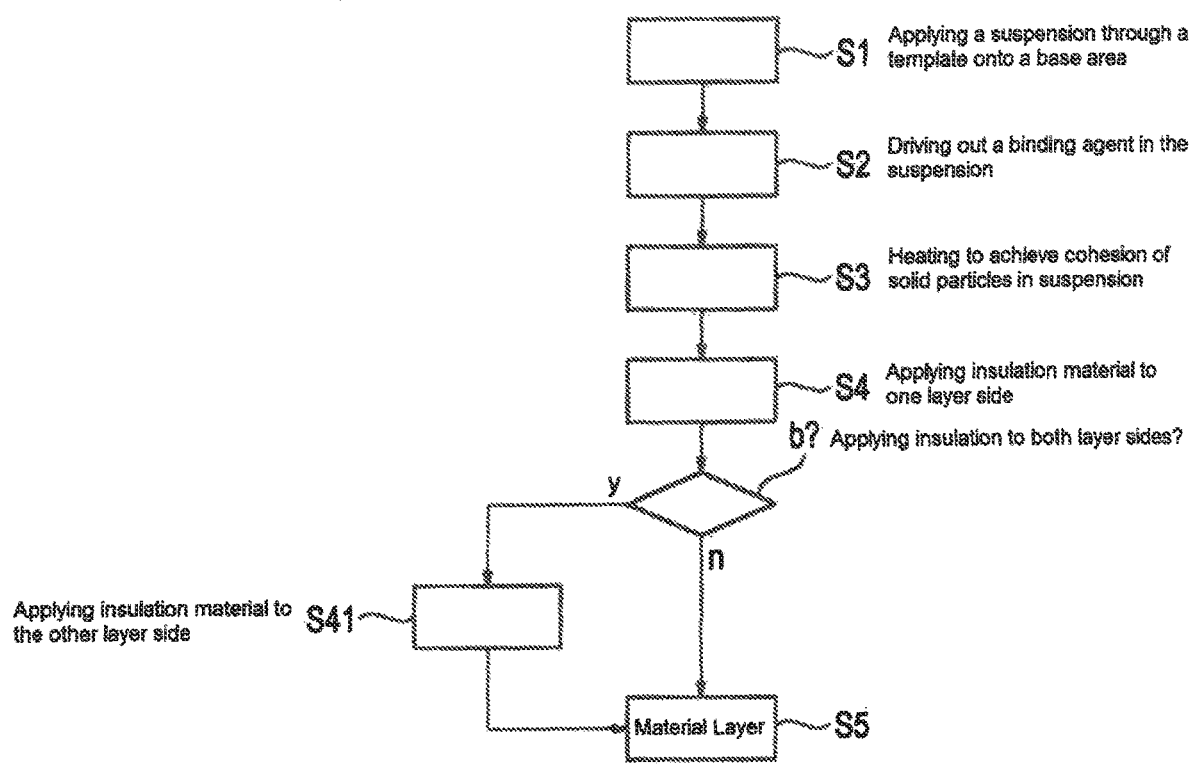
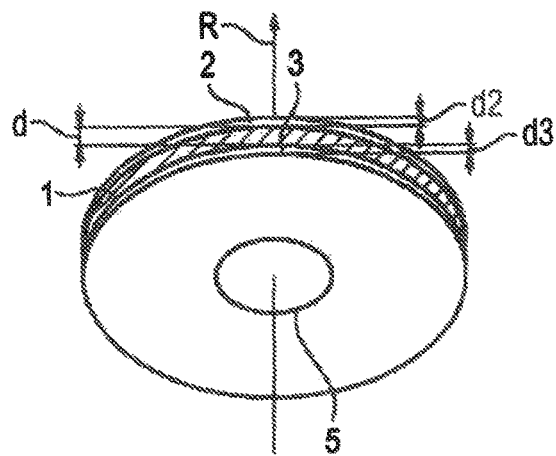

METHOD FOR PRODUCING A MATERIAL LAYER AND A MATERIAL LAYER STRUCTURE FOR A DYNAMOELECTRIC ROTARY MACHINE

CROSS-REFERENCES TO RELATED APPLICATIONS

This application is the US, National Stage of International Application No. PCT/EP2019/068480, filed Jul. 10, 2019, which designated the United States and has been published as international Publication No, WO 2020/011823 A1 and which claims the priority of European Patent Application, Serial No. 18183457.3, filed Jul. 13, 2018, pursuant to 35 U.S.C. 119(a)-(d).

BACKGROUND OF THE INVENTION

The invention relates to a method for producing a material layer with a layer thickness between 0.5 and 500 µm.

A stator and a rotor form part of the magnetic circuit of a dynamoelectric rotary machine. The rotor and the stator represent the power-generating components, also referred to as active parts, of the dynamoelectric rotary machine and have until now been manufactured as laminated cores.

Present-day laminated cores comprise metal sheets which are cut out or stamped from large rolled metal sheets made from soft-magnetic material. The sheets are then packeted to form a laminated core.

With conventional manufacture of large metal sheets by means of rollers, metal sheets which are thinner than 100 µm cannot be manufactured. In addition, waste accumulates from the large metal sheets when the metal sheets are cut out or stamped.

The object underlying the invention is therefore to improve the manufacture of metal sheets for dynamoelectric rotary machines.

SUMMARY OF THE INVENTION

The object is achieved by a method for producing a material layer with a layer thickness between 0.5 and 500 µm with the following steps:
   applying a suspension, having at least one binding agent and solid particles, through a template onto a base area to obtain a green body,
   driving out the binding agent from the green body, in particular by means of debindering,
   creating a permanent cohesion of the solid particles by heating and/or by means of compaction, in particular by means of sintering.

The object is also achieved by a material layer as set forth hereinafter and by a method for producing a material layer structure for a rotor of a dynamoelectric rotary as set forth hereinafter.

The object is moreover achieved by a material layer structure as for a rotor of a dynamoelectric rotary machine, wherein the material layer structure has a plurality of material layers arranged one above the other, a rotor of a dynamoelectric rotary machine having a material layer structure of this type, and a dynamoelectric rotary machine.

The material layer advantageously has the previous functions of a conventional metal sheet in a conventional rotor laminated core and realizes the tasks of a metal sheet.

Advantageously a perimeter of the material layer essentially corresponds to the perimeter of a metal sheet.

The material layer is advantageously produced to be thinner and/or can be produced to be thinner than a metal sheet.

The material layer structure advantageously has the previous functions of a rotor laminated core and realizes the tasks of a rotor laminated core.

The material layers are arranged one above the other in order to create the material layer structure. The material layers are preferably arranged in the direction of an axis of rotation, in other words along an axis of rotation, of the material layer structure.

Other arrangements, in which preferably at least two material layers are adjacent, are also conceivable.

The material layer preferably has a substantially round material cut-out which is arranged substantially centrally. The material layer structure preferably has a cylindrical material cut-out along the axis of rotation for connection to a shaft.

With a particularly stable material layer design, the material layer preferably has a layer thickness between 10 and 100 µm.

The suspension is preferably applied with a scraper.

The suspension has at least one binding agent which can be driven out, in particular by means of debindering, and solid particles.

The binding agent is preferably an organic binding agent. The binding agent is preferably provided so that with heating it dissociates completely or almost completely into gaseous components.

The solid particles preferably exist as powder. A solid particle preferably comprises at least one magnetically and/or electrically conductive material.

The solid particle preferably has a diameter between 0.1 and 100 µm.

In a special embodiment, the solid particle preferably has a diameter between 0.5 and 10 µm. The smaller the diameter of the solid particles, the thinner the material layers can therefore be produced. For instance, a suspension which has solid particles with a diameter of 0.5 µm produces a 0.5 µm thin material layer.

The powder can be solid particles of exclusively one material or a powder mixture comprising at least two different materials.

The powder can be adjusted with respect to stability, magnetic characteristics, electrical characteristics, and heat conduction.

The solid particles are permanently connected by means of heating and/or by means of compaction, in particular by means of sintering.

The sintering is preferably a thermal process, which is dependent in particular on the materials used. For instance, a temperature or a temperature range is dependent on an alloy of the material, other additives, and a desired result (after sintering).

The template is preferably a pattern for transmitting desired shapes and/or perimeters and/or samples and/or cut-outs etc. The template can be used as often as necessary.

The desired shape of the material layer can be formed accurately by means of the template. There is therefore no waste. Two or more templates can also be used for a material layer.

The template can be modified quickly and favorably (in particular more quickly than a stamping die).

Filigree shapes can also be reproduced by the template. The material layers with filigree shapes are particularly advantageous for a light construction of dynamoelectric rotary machines, cooling, and magnetic leakage.

In a further advantageous embodiment of the invention, an insulation material is applied to the material layer on at least one layer side.

The insulation material is preferably a ceramic, in particular an amagnetic oxide ceramic, for instance zirconium oxide or aluminum oxide.

The applied insulation material is preferably used for electrical insulation.

The applied insulation material is preferably used to electrically insulate a material layer with respect to at least one further material layer, if at least two or more material layers, in particular for creating a material layer structure, are arranged one above the other.

The advantageously applied insulation material therefore prevents current from being guided from one material layer to another material layer.

In a further advantageous embodiment of the invention, an insulation material is applied to the material layer on both layer sides.

If the insulation material is applied to the material layer on just one layer side, the material layer is thinner. If the insulation material is applied to the material layer on both layer sides, the material layer is better insulated.

In a further advantageous embodiment of the invention, a varnish, in particular thermosetting varnish, is applied to the material layer.

The varnish, in particular thermosetting varnish, can be the insulation material. However, varnish and insulation material can also be two different materials.

The advantageously applied thermosetting varnish enables a particularly good electric insulation of the material layer, in particular with respect to an adjacent further material layer in a material layer structure.

Furthermore, the material layer can be strengthened with the adjacent material layer or the adjacent material layers in particular by means of the thermosetting varnish.

The advantageously applied thermosetting varnish enables a high stability and rigidity of the material layer structure, since the material layers are connected in a planar manner. This also reduces vibrations and noises.

In a further advantageous embodiment of the invention, the solid particles comprise particles of electrically and/or magnetically conductive material, in particular metal particles.

The electrically conductive material is preferably silver, copper, gold, aluminum, tungsten, iron and/or steel and/or their alloys. Other electrically conductive materials are also conceivable, however.

The magnetically conductive material is preferably a ferromagnetic material.

In a further advantageous embodiment of the invention, the solid particles comprise particles of soft-magnetic material.

For instance, the soft magnetic material is iron, nickel, cobalt and/or their alloys. Other magnetically conductive, in particular ferromagnetic, materials are also conceivable, however.

In a further advantageous embodiment of the invention, the suspension is pseudoplastic.

This is advantageous in that while the suspension is applied onto the base area in order to generate the green body, preferably with a scraper, it is less viscous, and the desired shape can be transmitted optimally through the template. Once the application is terminated, the green body retains the desired shape.

The invention moreover relates to a material layer, which is produced in the manner described, wherein the material layer has a layer thickness between 0.5 and 500 µm, in particular between 10 and 100 µm, wherein the material layer has a soft-magnetic material, wherein the material layer has an insulation material on at least one layer side.

In a further advantageous embodiment of the invention, the material layer on both layer sides has an insulation material.

In a further advantageous embodiment of the invention, the material layer has varnish, in particular thermosetting varnish.

In a further advantageous embodiment of the invention, the material layer can be strengthened with at least one further material layer.

In a further advantageous embodiment of the invention, the material layer has a material cut-out arranged substantially centrally.

The material cut-out is preferably substantially circular. The material cut-out enables a connection to a shaft.

The invention moreover relates to a method for producing the material layer structure for the rotor of the dynamoelectric rotary machine with the following steps:
 additive manufacturing of a first material layer, wherein the first material layer comprises at least one material ply,
 applying an insulation material to the first material layer,
 additive manufacturing of at least one further material layer, wherein the at least one further material layer comprises at least one material ply,
 applying an insulation material to the at least one further material layer,
 joining the first and the at least one further material layer,
 reciprocal strengthening of the material layers.

The material layer comprises at least one material ply, i.e. only one ply of the solid particles. The material layer is particularly thin as a result. In order to obtain a stable material layer, two or more material layers one above the other are advantageous, however.

In a preferred embodiment, the applied insulation material is varnish, in particular thermosetting varnish. The application of thermosetting varnish is easy and by means of thermosetting two or more material layers can be strengthened mutually.

The insulation material, in particular the thermosetting varnish, and the material layer are preferably connected with a material bond.

In an alternative embodiment, the insulation material is ceramic.

Soluble glass and other glasses are moreover conceivable as insulation material.

Other insulation materials are also possible.

The application of a ceramic insulation material is particularly successful if a ceramic suspension, comprising solid ceramic particles and a binding agent which can be driven out, is applied to the material layer with a scraper. The solid ceramic particles preferably exist as ceramic powder.

The solid ceramic particles can have magnesium oxide, titanium dioxide, silicon carbide, silicon nitride, boron carbide, boron nitride and/or aluminum nitride. Other materials are also conceivable.

An oxide ceramic, in particular zirconium oxide and/or aluminum oxide, is preferable, however.

A solid ceramic particle preferably has substantially a diameter between 0.1 and 2 µm.

The smaller the diameter of the solid ceramic particles, the thinner the insulated material layers can therefore be produced. For instance, a suspension which has solid particles with a diameter of 0.5 µm and a suspension which has solid ceramic particles with a diameter of 1 μm can produce a 1.5 μm thin insulated material layer on one side or a 2.5 μm thin insulated material layer on both sides.

With a particularly thin material layer design, the material layer has a layer thickness of 1 μm.

The ceramic solid particles form at least one material ply. Two or more material plies are also possible, however.

The ceramic powder can be ceramic solid particles of exclusively one material or a ceramic powder mixture comprising at least two different ceramic materials.

The ceramic solid particles are permanently connected by heating and/or by means of compaction, in particular by means of sintering. The ceramic solid particles are preferably permanently connected to the solid particles by heating and/or by means of compaction, in particular by means of sintering. The permanent connection is preferably a material-bonded connection.

In a further advantageous embodiment of the invention, a material layer structure is produced by means of a plurality of material layers with a layer thickness of 0.5 to 500 μm.

The material layer structure is suited to a rotor of a dynamoelectric rotary machine, wherein the material layer structure has a plurality of material layers arranged in the direction of a rotor axis of the material layer structure.

The rotor of the dynamoelectric rotary machine has a material layer structure of this type.

The invention further relates to a dynamoelectric rotary machine having a rotor of this type.

The dynamoelectric rotary machine comprises a rotor with a plurality of material layers arranged one above the other. The material layers are preferably embodied in each case separately electrically insulated against one another. The arrangement levels are advantageously embodied parallel to the direction of the magnetic flux.

Since the material layers only have a very small layer thickness, eddy current losses are significantly reduced. This is because an eddy current can only form within the layer thickness of the material layer, as a result of which the eddy current strength is significantly reduced in the case of thin material layers.

The insulation between the individual material layers prevents the eddy currents from overlaying to become large, lossy eddy currents.

The invention is preferably applied in dynamoelectric rotary machines. However, the invention can also be used in other energy converters, such as e.g. transformers.

The invention can moreover be applied to a stator of a dynamoelectric rotary machine. In this regard a plurality of material layers arranged one above the other preferably replaces a conventional stator laminated core.

The invention is particularly well suited to motors which require a high output with a low weight, particularly in airplanes, helicopters, and Formula One racing cars.

BRIEF DESCRIPTION OF THE DRAWING

The invention is described and explained in more detail below with the aid of the exemplary embodiments shown in the figures, in which:

FIG. 1 shows the inventive method for producing a material layer with a layer thickness between 0.5 and 500 μm, FIG. 2 shows the material layer.

DETAILED DESCRIPTION OF PREFERRED EMBODIMENTS

Figure 3:
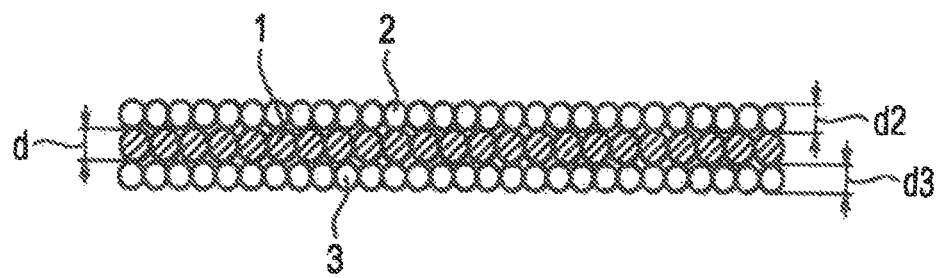
FIG. 3 shows the material layer in a side view.

FIG. 1 shows the inventive method for producing a material layer with a layer thickness between 0.5 and 500 μm.

The layer thickness preferably amounts to between 10 and 100 μm for a stable material layer.

In method step S1, a suspension having at least one binding agent and solid particles is applied through a template onto a base area in order to obtain a green body. Applied here means preferably that the suspension is applied onto the base area with a scraper.

In method step S2, the binding agent is driven out of the green body, in particular by means of debindering.

In method step S3, permanent cohesion of the solid particles is achieved by heating and/or by means of compaction, in particular by means of sintering.

In method step S4, insulation material is applied to one layer side. Applied here means preferably that the insulation material is applied to the layer side with a scraper or the layer side is coated with a coating tool or the layer side is immersed into a vessel which contains the insulation material.

The insulation material is preferably varnish, in particular thermosetting varnish.

Other insulation materials are also conceivable, however. The insulation material can for example be applied to the layer side by means of a ceramic suspension, having at least one binding agent and ceramic solid particles, and the binding agent can be driven out in particular by means of debindering.

Moreover, there is the possibility of applying an insulation material in a method step S4a (not shown) and in addition varnish, in particular thermosetting varnish, in a method step S4b (not shown).

If both layer sides are to be provided with insulation material and/or varnish, identified with b? and y, this is accomplished in method step S41.

If only one layer side is to be provided with insulation material and/or varnish, in a method step S5 the material layer is completed in the method by means of b? and n.

FIG. 2 shows the material layer 1.

The material layer 1 has the layer thickness d. The material layer is preferably in one piece.

Each material layer 1 preferably has an insulation material on at least one layer side. The figure shows an embodiment according to which each material layer 1 has an insulation material on both layer sides. In the figure the insulation material is varnish, in particular thermosetting varnish. This corresponds to a preferred embodiment.

The insulation material and the material layer are preferably connected with a material bond.

The material layer 1 has varnish 2 with an insulation thickness d2 on an upper layer side and varnish 3 with an insulation thickness d3 on a lower layer side.

It is also possible for the material layer 1 to have a different type of insulation material and additionally varnish. It is also possible for the material layer 1 to have a different type of insulation material on one layer side and varnish on the other layer side. It is also possible for the material layer 1 to have a hybrid form comprising other types of insulation material and varnish.

Figure 5:
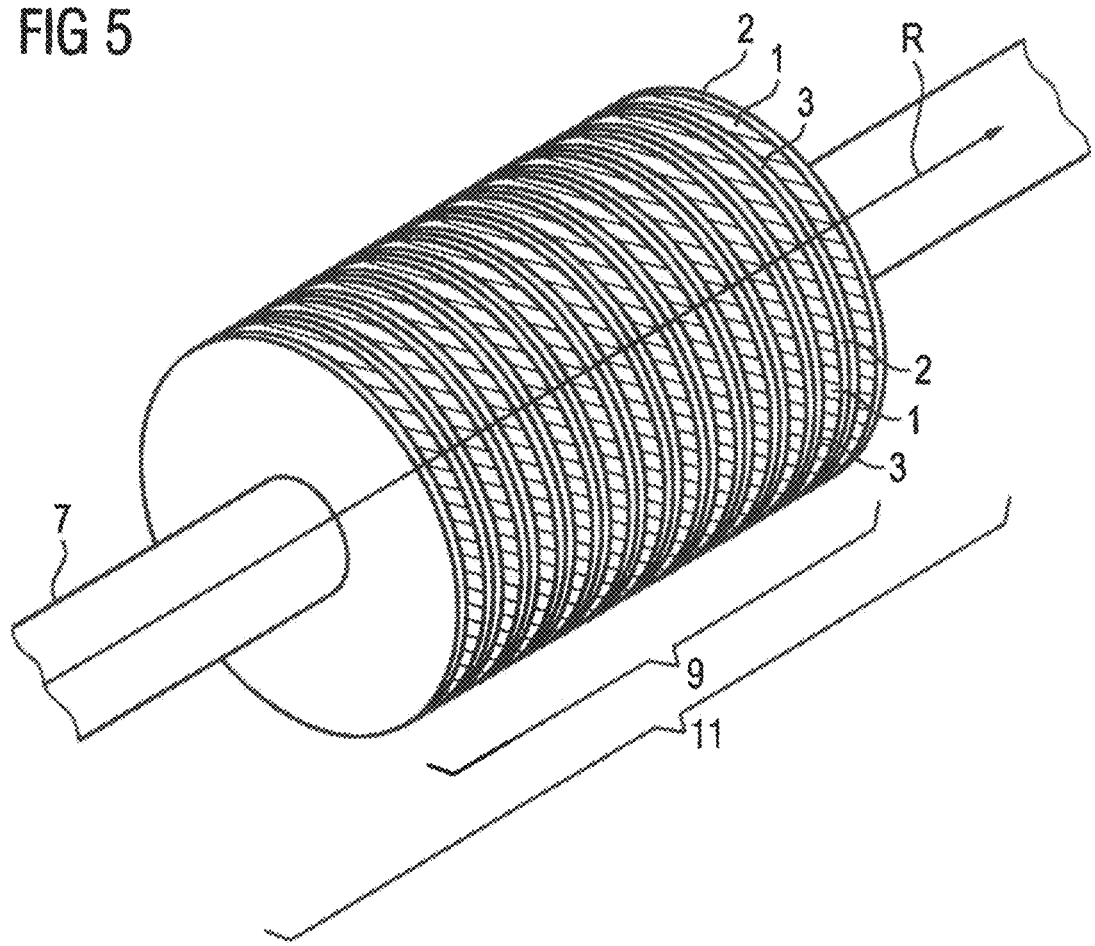
FIG. 5 shows a rotor of the dynamoelectric rotary machine.
Figure 6:
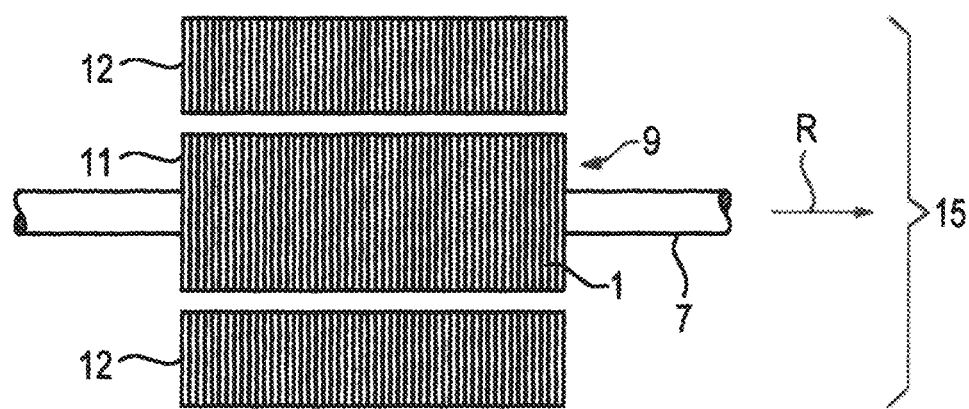
FIG. 6 shows a side view of the dynamoelectric rotary machine.

The figure moreover shows a material cut-out 5 arranged centrally (for subsequent connection to a shaft, see FIG. 5).

An axis of rotation R runs through a center point of the material cut-out 5.

The described reference characters are also valid for the following figures, provided they are present in the exemplary embodiments, and are not explained again for reasons of clarity.

FIG. 3 shows the material layer 1 in a side view.

The figure shows the thinnest embodiment of the material layer 1, since only one ply of solid particles forms the material layer 1. In the figure the solid particles are granular material. In other words, the solid particles are small beads which lie adjacent to one another and are connected to one another, preferably by means of the sintering described in FIG. 1.

In the figure the layer thickness d corresponds to a diameter of a solid particle.

Similarly, the figure only shows one ply of the insulation material 2 on the upper layer side and only one ply of the insulation material 3 on the lower layer side. The insulation thickness d2 and the insulation thickness d3 correspond in the figure to a diameter of a ceramic solid particle or a varnish solid particle.

Two or more solid particles one above the other can also form the material layer 1, however. Two or more ceramic solid particles one above the other can also form the insulation. Two or more varnish solid particles one above the other can also form the insulation.

Figure 4:
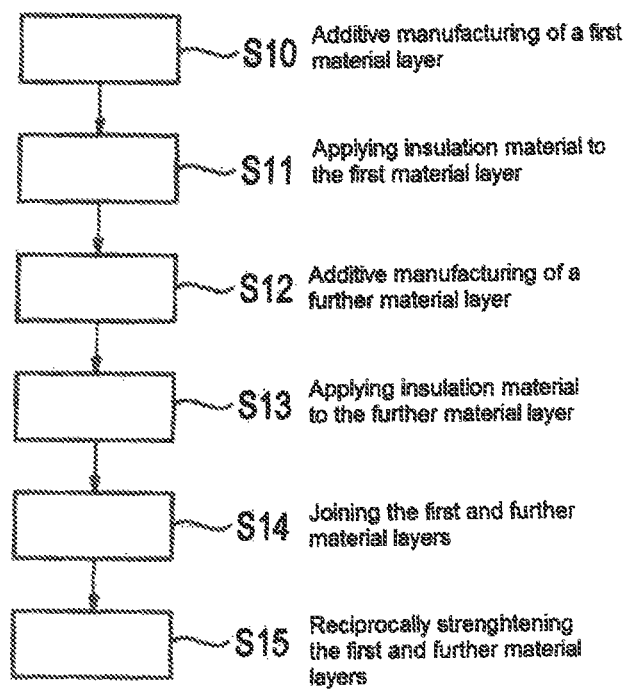
FIG. 4 shows a method for producing a material layer structure for a rotor of a dynamoelectric rotary machine.

FIG. 4 shows a method for producing a material layer structure for a rotor of a dynamoelectric rotary machine.

In method step S10, a first material layer is manufactured additively, wherein the first material layer comprises at least one material ply.

In method step S11, insulation material is applied to the first material layer. Here the insulation material is preferably varnish, in particular thermosetting varnish. The insulation material can however also be ceramic or another material.

In method step S12, at least one further material layer is manufactured additively, wherein the at least one further material layer comprises at least one material ply.

In method step S13, an insulation material is applied to the at least one further material layer.

In method step S14, the first and the at least one further material layer are joined.

In method step S15, the material layers are strengthened reciprocally. If thermosetting varnish was applied to the material layers in the method steps S11 or S13, the material layers are strengthened with one another by means of thermosetting.

Here thermosetting means that the material layers are preferably glued to one another by means of pressure and heat. Pressure and heat render the thermosetting varnish soft and the material layers adhere to one another and harden. This is advantageous compared with other connection options such as welding, stamping and riveting in that the material layers have no contact points which damage material. Moreover, a magnetic flux is not disturbed and no material stresses and material deformations occur.

The method shown is also suited to a stator of a dynamoelectric rotary machine.

FIG. 5 shows a rotor 11 of the dynamoelectric rotary machine.

The rotor 11 has a material layer structure 9. In the figure the material layer structure comprises a plurality of material layers 1 arranged one above the other along the axis of rotation. The material layer structure 9 is connected to a shaft 7.

The material layer 1 in the figure is strengthened with at least one further material layer. The figure shows a plurality of material layers 11 which are strengthened with one another.

The strengthening is particularly successful using thermosetting varnish since this can be applied easily. An especially subsequent thermosetting of the material layers 1 creates a stable and robust connection.

FIG. 8 shows a side view of the dynamoelectric rotary machine 15.

The machine 15 has the rotor 11 which comprises the shaft 7 and the material layer structure 9. The rotor 11 can rotate in a stator 12 according to the axis of rotation R.

What is claimed is:

1. A method for producing a shaped material layer having an outer perimeter and a centrally arranged substantially round material cut-out, without further machining, said method comprising:
   providing a template having an annular cutout complementary to the outer perimeter of the shaped material layer and to the centrally arranged substantially round material cut-out of the shaped material layer,
   applying, with a scraper, a suspension with a binding agent and solid particles through the template onto a base area for obtaining a green body having the outer perimeter and the centrally arranged substantially round material cut-out and a layer thickness between 0.5 and 500 µm,
   driving the binding agent out of the green body, in particular by debindering; and
   creating a permanent cohesion of the solid particles by at least one of heating, compaction, and sintering, thereby producing the material layer with the outer perimeter and the centrally arranged substantially round material cut-out and the layer thickness between 0.5 and 500 µm without further machining.

2. The method of claim 1, further comprising applying insulation material to the material layer on at least one layer side.

3. The method of claim 1, further comprising applying insulation material to the material layer on both layer sides.

4. The method of claim 1, further comprising applying a varnish, in particular thermosetting varnish, to the material layer.

5. The method of claim 1, wherein the solid particles comprise particles of et least one of an electrically and magnetically conductive material.

6. The method of claim 1, wherein the solid particles comprise particles from soft-magnetic material.

7. The method of claim 1, wherein the suspension is pseudoplastic.

8. A material layer produced by a method as set forth in claim 1, said material layer having a layer thickness between 0.5 and 500 µm, in particular between 10 and 100 µm, and comprising:
   a soft-magnetic material; and
   an insulation material on at least one layer side of the material layer.

9. The material layer of claim 8, wherein the insulation material is applied on both layer sides of the material layer.

10. The material layer of claim 8, wherein the insulation material is varnish, in particular thermosetting varnish.

11. The material layer of claim 8, configured with a further material layer applied to the material layer for strengthening the material layer.

12. The material layer of claim 8, wherein the material layer has a material cut-out arranged substantially centrally.

13. A method for producing a material layer structure for a rotor of a dynamoelectric rotary machine, said method comprising:
- additive manufacturing of a first material layer produced by a method as set forth in claim 1 such that the first material layer comprises at least one material ply;
- applying an insulation material to the first material layer;
- additive manufacturing of a second material layer such that the second material layer comprises a material ply;
- applying an insulation material to the second material layer; and
- joining the first and second material layers
- to mutually strengthen the first and second material layers.

14. The method of claim 13, further comprising applying through additive manufacturing additional material layers of a number sufficient to produce the material layer structure, with each of the material layers having a layer thickness of 0.5 to 500 μm.

15. A material layer structure for a rotor of a dynamoelectric rotary machine, said material layer structure comprising a plurality of material layers arranged one above the other and produced by a method as set forth in claim 13, each said material layer having a layer thickness between 0.5 and 500 μm and including a soft-magnetic material and an insulation material on at least one side of the material layer.

16. The material layer structure of claim 15, wherein the insulation material is applied on both layer sides of the material layer.

17. The material layer structure of claim 15, wherein the insulation material is varnish, in particular thermosetting varnish.

18. The material layer of claim 15, wherein the material layer has a material cutout arranged substantially centrally.

19. The method of claim 1, wherein the solid particles comprise metal particles.

* * * * *